(12) United States Patent
Li

(10) Patent No.: US 11,387,662 B2
(45) Date of Patent: Jul. 12, 2022

(54) HEADSET CHARGING AND DATA TRANSMISSION SYSTEM

(71) Applicant: MERRY ELECTRONICS (SHENZHEN) CO., LTD., Guangdong (CN)

(72) Inventor: Hung-Yuan Li, Taichung (TW)

(73) Assignee: MERRY ELECTRONICS (SHENZHEN) CO., LTD., Guangdong (CN)

( * ) Notice: Subject to any disclaimer, the term of this patent is extended or adjusted under 35 U.S.C. 154(b) by 128 days.

(21) Appl. No.: 16/941,521

(22) Filed: Jul. 28, 2020

(65) Prior Publication Data
US 2021/0328447 A1    Oct. 21, 2021

(30) Foreign Application Priority Data

Apr. 21, 2020 (TW) ................. 109113377

(51) Int. Cl.
*H02J 7/00* (2006.01)
*H04R 1/10* (2006.01)

(52) U.S. Cl.
CPC .......... *H02J 7/0034* (2013.01); *H02J 7/0042* (2013.01); *H04R 1/1025* (2013.01)

(58) Field of Classification Search
CPC ........................................................ H02J 7/00
See application file for complete search history.

(56) References Cited

U.S. PATENT DOCUMENTS

2018/0278075 A1* 9/2018 Pawar ................... H02J 7/0047

* cited by examiner

*Primary Examiner* — Robert Grant
(74) *Attorney, Agent, or Firm* — CKC & Partners Co., LLC

(57) ABSTRACT

The present disclosure provides a headset charging and data transmission system, which includes a headset and a charging device. The charging device includes a first controller, a first connector, a first switching device, and a second switching device. The first switching device is electrically connected to the first controller and the first connector, and the second switching device is electrically connected to the first controller and the first switching device. The first controller controls the second switching device to switch between the first and second voltages to provide a first data signal for the first switching device, so that the first data signal is output to the headphones via the first connector.

10 Claims, 2 Drawing Sheets

HEADSET CHARGING AND DATA TRANSMISSION SYSTEM

RELATED APPLICATIONS

This application claims priority to Taiwan Patent Application No. 109113377, filed Apr. 21, 2020, the entirety of which is herein incorporated by reference.

BACKGROUND

Field of Invention

The present invention relates to systems, and more particularly, headset charging and data transmission systems.

Description of Related Art

The traditional headset requires charging lines and data transmission lines respectively. However, the respective charging lines and data transmission lines cause the headset to be bulky and have many contacts.

In view of above, there is an urgent need in the related field to reduce lines.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

In one or more various aspects, the present disclosure is directed to charging and data transmission systems, to solve or circumvent aforesaid problems and disadvantages in the related art.

An embodiment of the present disclosure is related to a charging and data transmission system. The charging and data transmission system includes a headset and a charging device. The charging device includes a first controller, a first connector, a first switching device and a second switching device. The first connector is configured to connect the headset. The first switching device is electrically connected to the first controller and the first connector. The first switching device has a first sending terminal, a first receiving terminal, a power supply terminal and a first transmission terminal. The first transmission terminal is electrically connected to the first connector. The first transmission terminal is electrically connected to one of the first sending terminal, the first receiving terminal and the power supply terminal selectively. The second switching device is electrically connected to the first controller and the first switching device, and the second switching device has a first voltage input terminal, a second voltage input terminal and a first output terminal. The first output terminal is electrically connected to the first sending terminal. The first voltage input terminal is configured to receive a first voltage, and the second voltage input terminal is configured to receive a second voltage. The first controller is based on first data to control the second switching device to electrically connect the first output terminal to the first voltage input terminal or the second voltage input terminal alternately, so that the first output terminal can provide a signal of the first data for the first sending terminal. The first controller is configured to control the first switching device to electrically connect the first sending terminal to the first transmission terminal, so that the first connector can output the signal of the first data to the headset.

In one embodiment of the present disclosure, the first controller controls the first switching device to electrically connect the first receiving terminal to the first transmission terminal, so that the first receiving terminal can receive a signal of second data that is sent from the headset to the first connector. The charging device further includes a first receiver. The first receiver is electrically connected to the first receiving terminal and the first controller. The first receiver is configured to amplify and send the signal of the second data to the first controller.

In one embodiment of the present disclosure, when the charging device does not send the signal of the first data and does not receive the signal of the second data, the first controller controls the first switching device to electrically connect the power supply terminal to the first transmission terminal, so that the charging device can charge the headset.

In one embodiment of the present disclosure, the charging device further includes a voltage converter circuit and a battery. The voltage converter circuit is electrically connected to the power supply terminal. The battery is electrically connected to the voltage converter circuit.

In one embodiment of the present disclosure, before the charging device prepares to send the signal of the first data, an output of the voltage converter circuit is dropped from the first voltage to a third voltage as a first interruption signal to notify the headset of a pause of charging and preparing to receive the signal of the first data, where the second voltage is between the first voltage and the third voltage.

In one embodiment of the present disclosure, before the headset prepares to send the signal of the second data, the headset sends a second interruption signal. The charging device further includes a first comparator. The first comparator is electrically connected to the first receiving terminal and the first controller. The first comparator is configured to compare the second interruption signal with a first predetermined level, so as to notify the first controller of preparing to receive the signal of the second data.

In one embodiment of the present disclosure, the headset includes a second controller, a second connector and a third switching device. The second connector is configured to connect the first connector. The third switching device is electrically connected to the second controller and the second connector. The third switching device has a second sending terminal, a second receiving terminal and a second transmission terminal. The second transmission terminal is electrically connected to the second connector. When the charging device charges the headset, the second controller is configured to control the third switching device to electrically connect the second receiving terminal to the second transmission terminal.

In one embodiment of the present disclosure, the headset further includes a second comparator. The second comparator is electrically connected to the second receiving terminal and the second controller. The second comparator is configured to compare the first interruption signal with a second predetermined level, so as to notify the second controller of the pause of the charging and preparing to receive the signal of the first data.

In one embodiment of the present disclosure, the headset further includes a second receiver. The second receiver is electrically connected to the second receiving terminal and the second controller. The second receiver is configured to amplify and send the signal of the first data to the second controller.

In one embodiment of the present disclosure, the headset further includes a fourth switching device. The fourth switching device is electrically connected to the second controller and the third switching device. The fourth switching device has a third voltage input terminal, a fourth voltage input terminal, a fifth voltage input terminal, and a second output terminal. The second output terminal is electrically connected to the second sending terminal. The third voltage input terminal is configured to receive the third voltage, the fourth voltage input terminal is configured to receive the second voltage, and the fifth voltage input terminal is configured to receive the first voltage. Before preparing to send the signal of the second data, the second controller is configured to control the fourth switching device to electrically connect the third voltage input terminal to the second output terminal, so that the second output terminal can provide the third voltage as the second interruption signal for the second sending terminal. The second controller is configured to control the third switching device to electrically connect the second sending terminal to the second transmission terminal, so that the second connector can output the second interruption signal to the charging device. After the second interruption signal is sent, the second controller is based on the second data to control the fourth switching device to electrically connect the second output terminal to the fourth voltage input terminal or the fifth voltage input terminal alternately, so that the second output terminal can provide the signal of the second data and can output the signal of the second data to the charging device through the second connector.

Technical advantages are generally achieved, by embodiments of the present disclosure. With the technical solution of the present disclosure, the data transmission is realized on the power rail without additional data transmission lines and contacts, thereby effectively reducing the volume of the headset.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
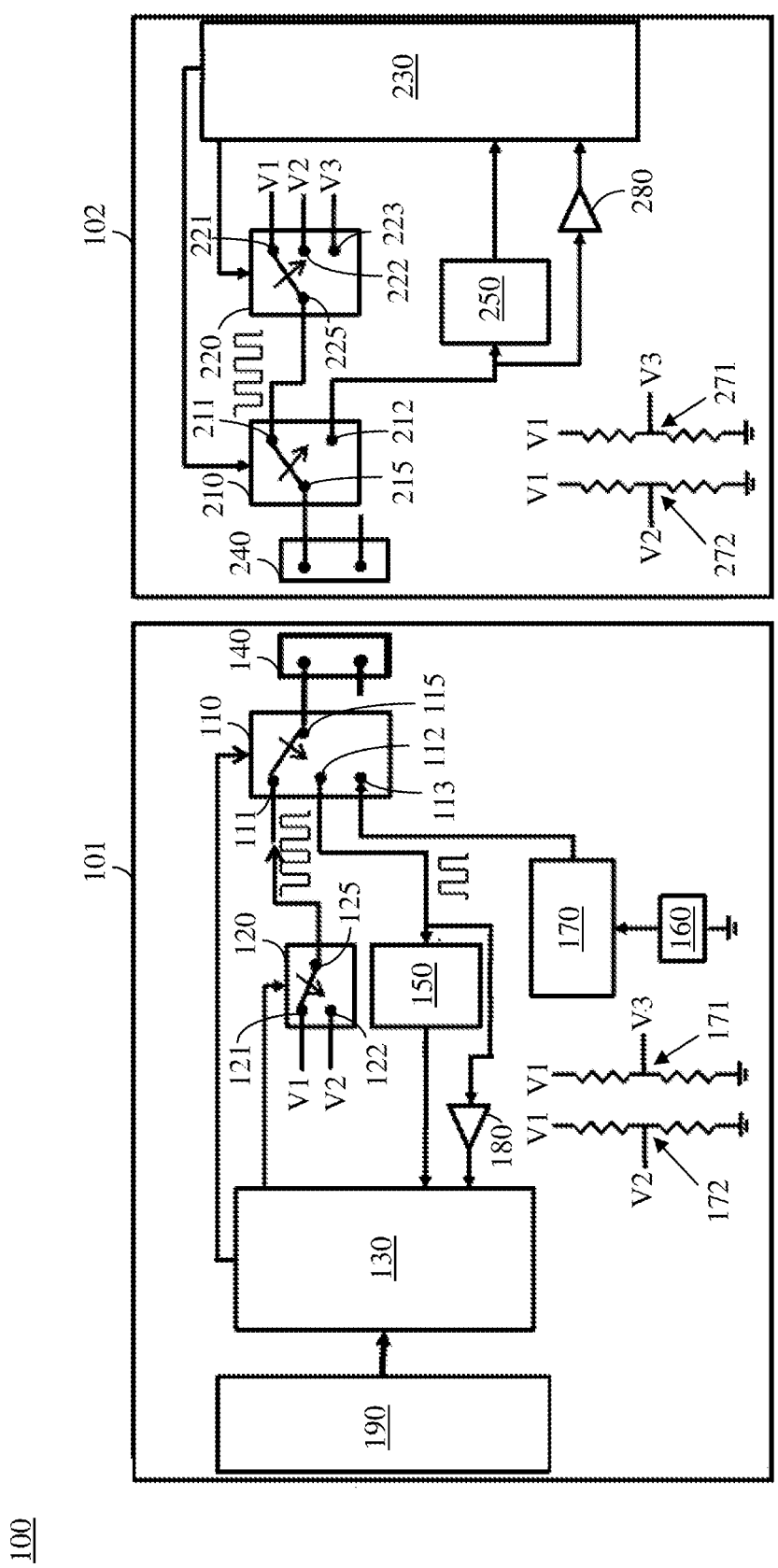
FIG. 1 is a block diagram of a charging and data transmission system according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a charging and data transmission system 100 according to one embodiment of the present disclosure. As shown in FIG. 1, the headset charging and data transmission system 100 includes a headset 102 and a charging device 101. For example, the headset 102 may be a wireless headset. When the headset 102 is connected to the charging device 101, the charging device 101 charges the headset 102, and the charging device 101 and the headset 102 can transmit data to each other.

In one embodiment of the present disclosure, the charging device 101 at least includes a first controller 130, a first connector 140, a first switching device 110 and a second switching device 120. In use, the first connector 140 is configured to connect the headset 102.

In FIG. 1, the first controller 130 is electrically connected to the joint 190, and the first switching device 110 is electrically connected to the first controller 130 and the first connector 140. In structure, the first switching device 110 has a first sending terminal 111, a first receiving terminal 112, a power supply terminal 113 and a first transmission terminal 115. The first transmission terminal 115 is electrically connected to the first connector 140. Through the control of the first controller 130, the first transmission terminal 115 can be electrically connected to one of the first sending terminal 111, the first receiving terminal 112 and the power supply terminal 113 selectively.

In FIG. 1, the second switching device 120 is electrically connected to the first controller 130 and the first switching device 110. In structure, the second switching device 120 has a first voltage input terminal 121, a second voltage input terminal 122 and a first output terminal 125. The first output terminal 125 is electrically connected to the first sending terminal 111.

In use, the joint 190 can receive an external voltage (e.g., a first volt), the first voltage input terminal 121 receives the first voltage V1 (e.g., about 5 volt), and the second voltage input terminal 122 receives the second voltage V2 (e.g., about 4.75 volt). The first controller 130 is based on first data (e.g., instructions, exchange information, etc.) to control the second switching device 120 to electrically connect the first output terminal 125 to the first voltage input terminal 121 or the second voltage input terminal 122 alternately, so that the first output terminal 125 can provide a signal of the first data for the first sending terminal 111. The first controller 130 controls the first switching device 110 to electrically connect the first sending terminal 111 to the first transmission terminal 115, so that the first connector 140 can output the signal of the first data to the headset 102. Thus, the charging device 101 can transmit data to the headset 102.

When the headset 102 transmits data to the charging device 101, the first controller 130 controls the first switching device 110 to electrically connect the first receiving terminal 112 to the first transmission terminal 115, so that the first receiving terminal 112 can receive a signal of second data that is sent from the headset 102 to the first connector 140.

In one embodiment of the present disclosure, the charging device 101 can include a first receiver 150. The first receiver 150 is electrically connected to the first receiving terminal 112 and the first controller 130. The first receiver 150 amplifies and sends a signal of the second data to the first controller 130, so as to facilitate the first controller 130 for data reading.

When the charging device 101 does not send the signal of the first data and does not receive the signal of the second data, the first controller 130 controls the first switching device 110 to electrically connect the power supply terminal 113 to the first transmission terminal 115, so that the charging device 101 can charge the headset 102.

In one embodiment of the present disclosure, the charging device 101 can further include a voltage converter circuit 170 and a battery 160. In structure, the voltage converter circuit 170 is electrically connected to the power supply terminal 113, and the battery 160 is electrically connected to the voltage converter circuit 170.

Before the charging device 101 prepares to send the signal of the first data, an output of the voltage converter circuit 170 is dropped from the first voltage V1 to a third voltage V3 (e.g., 4.5 volt) as a first interruption signal to notify the headset 102 of a pause of charging and preparing to receive the signal of the first data.

For example, the first voltage divider circuit 171 can decrease the first voltage V1 to the third voltage V3, and the second voltage divider circuit 172 can decrease the first voltage V1 to the second voltage V2. The first voltage V1 is applied to the first voltage input terminal 121, and the second voltage V2 is applied to the second voltage input terminal 122, where the second voltage V2 is between the first voltage V1 and the third voltage V3.

Before the headset 102 prepares to send the signal of the second data, the headset 102 sends a second interruption signal, to notify the charging device 101 of a pause of charging and preparing to receive the signal of the second data.

In one embodiment of the present disclosure, the charging device 101 further includes a first comparator 180. In structure, the first comparator 180 is electrically connected to the first receiving terminal 112 and the first controller 130. The first comparator 180 compare the second interruption signal with a first predetermined level, so as to notify the first controller 130 of preparing to receive the signal of the second data. For example, when the second interruption signal (e.g., 4.5 volt) is lower than the first predetermined level (e.g., 4.6 volt), the first controller 130 prepares to receive the signal of the second data.

In FIG. 1, the headset 102 at least includes a second controller 230, a second connector 240 and a third switching device 210. In use, the second connector 240 is configured to connect the first connector 140. In structure, the third switching device 210 is electrically connected to the second controller 230 and the second connector 240. The third switching device 210 has a second sending terminal 211, a second receiving terminal 212 and a second transmission terminal 215, and the second transmission terminal 215 is electrically connected to the second connector 240. When the charging device 101 charges the headset 102, the second controller 230 controls the third switching device 210 to electrically connect the second receiving terminal 212 to the second transmission terminal 215.

In one embodiment of the present disclosure, the headset 102 can further include a second comparator 280. In structure, the second comparator 280 is electrically connected to the second receiving terminal 212 and the second controller 230. In use, the second comparator 280 compares the first interruption signal with a second predetermined level, so as to notify the second controller 230 of the pause of the charging and preparing to receive the signal of the first data. For example, when the first interruption signal (e.g., 4.5 volt) is lower than the second predetermined level (e.g., 4.6 volt), the second controller 230 prepares to receive the signal of the first data.

In one embodiment of the present disclosure, the headset 102 can further include a second receiver 250. In structure, the second receiver 250 is electrically connected to the second receiving terminal 212 and the second controller 230. In use, the second receiver 250 amplifies and sends the signal of the first data to the second controller 230, so as to facilitate the second controller 230 for data reading.

In one embodiment of the present disclosure, the headset 102 can further include a fourth switching device 220. In structure, the fourth switching device 220 is electrically connected to the second controller 230 and the third switching device 210. The fourth switching device 220 has a third voltage input terminal 223, a fourth voltage input terminal 222, a fifth voltage input terminal 221 and a second output terminal 225, and the second output terminal 225 is electrically connected to the second sending terminal 211.

In use, the third voltage divider circuit 271 can decrease the first voltage V1 to the third voltage V3, and the fourth voltage divider circuit 272 can decrease the first voltage V1 to the second voltage V2. The third voltage input terminal 223 receives the third voltage V3, the fourth voltage input terminal 222 receives the second voltage V2, and the fifth voltage input terminal 221 receives the first voltage V1.

Before preparing to send the signal of the second data, the second controller 230 controls the fourth switching device 220 to electrically connect the third voltage input terminal 223 to the second output terminal 225, so that the second output terminal 225 can provide the third voltage V3 as the second interruption signal for the second sending terminal 211. The second controller 230 controls the third switching device 210 to electrically connect the second sending terminal 211 to the second transmission terminal 215, so that the second connector 240 can output the second interruption signal to the charging device 101, so that the charging device 101 can interrupt the charging and can prepare to receive the signal of the second data.

After the second interruption signal is sent, the second controller 230 is based on the second data (e.g., instructions, exchange information, etc.) to control the fourth switching device 220 to electrically connect the second output terminal 225 to the fourth voltage input terminal 222 or the fifth voltage input terminal 221 alternately, so that the second output terminal 225 can provide the signal of the second data and can output the signal of the second data to the charging device 101 through the second connector 240.

In practice, the high level in the signals of the first and second data is the first voltage V1, and the low level in the signals of the first and second data is the second voltage V2. As to the control of the first and second controllers 130 and 230, for example, the low level with one unit of time width represents an initial signal, the low level with two units of time width represents the "0" logic level, the low level with three units of time width represents the "1" logic level, the low level with four units of time width represents an end signal, and the low level with five units of time width represents a last data signal. It should be noted that the foregoing is only an example and does not limit the present disclosure. Those with ordinary skill in the art may flexibly adjust related setting depending on the desired application.

In practice, the signals of the first and second data may include a checksum or codes of cyclic redundancy check (CRC) to allow the receiver to confirm the data integrity.

Figure 2:
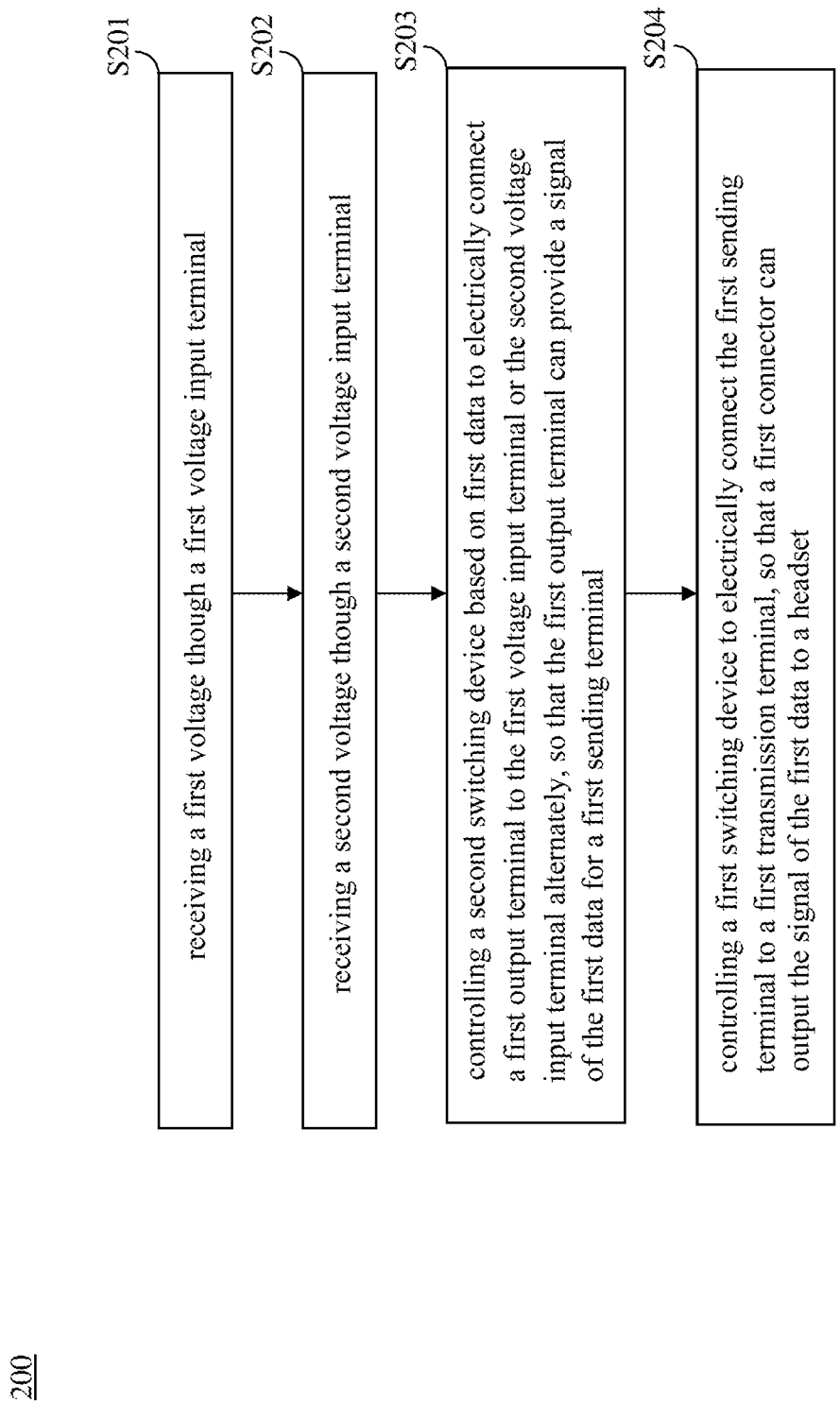
FIG. 2 is a flow chart of a charging and data transmission method according to one embodiment of the present disclosure.

For a more complete understanding of an operating method of the headset charging and data transmission system 100, referring FIGS. 1-2, FIG. 2 is a flow chart of a headset charging and data transmission method 200 according to one embodiment of the present disclosure. As shown in FIG. 2, the headset charging and data transmission method 200 includes operations S201-S204. However, as could be appreciated by persons having ordinary skill in the art, for the steps described in the present embodiment, the sequence in which these steps is performed, unless explicitly stated otherwise, can be altered depending on actual needs; in certain cases, all or some of these steps can be performed concurrently.

In operation S201, the first voltage V1 is received though the first voltage input terminal 121. In operation S202, the second voltage V2 is received though the second voltage input terminal 122. In operation S203, the second switching device 120 is controlled based on the first data to electrically connect the first output terminal 125 to the first voltage input terminal 121 or the second voltage input terminal 122 alternately, so that the first output terminal 125 can provide the signal of the first data for the first sending terminal 111. In operation S204, the first switching device 110 is controlled to electrically connect the first sending terminal 111 to the first transmission terminal 115, so that the first connector 140 can output the signal of the first data to the headset 102, thereby performing the data transmission.

It should be noted that the functions performed by the implements in the headset charging and data transmission system 100 can be included in the operations of the headset charging and data transmission method 200. Since the above embodiments have specifically disclosed the functions of the implements, and thus, are not repeated herein.

In view of above, technical advantages are generally achieved, by embodiments of the present disclosure. With the technical solution of the present disclosure, the data transmission is realized on the power rail of the charging device 101 without additional data transmission lines and contacts, thereby effectively reducing the volume of the headset 102.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A headset charging and data transmission system, comprising:
    a headset; and
    a charging device comprising:
        a first controller;
        a first connector configured to connect the headset;
        a first switching device electrically connected to the first controller and the first connector, the first switching device having a first sending terminal, a first receiving terminal, a power supply terminal and a first transmission terminal, the first transmission terminal electrically connected to the first connector, the first transmission terminal electrically connected to one of the first sending terminal, the first receiving terminal and the power supply terminal selectively; and
        a second switching device electrically connected to the first controller and the first switching device, the second switching device having a first voltage input terminal, a second voltage input terminal and a first output terminal, the first output terminal electrically connected to the first sending terminal, the first voltage input terminal configured to receive a first voltage, the second voltage input terminal configured to receive a second voltage, the first controller based on first data to control the second switching device to electrically connect the first output terminal to the first voltage input terminal or the second voltage input terminal alternately, so that the first output terminal provides a signal of the first data for the first sending terminal, and the first controller configured to control the first switching device to electrically connect the first sending terminal to the first transmission terminal, so that the first connector outputs the signal of the first data to the headset,
    wherein the first controller controls the first switching device to electrically connect the first receiving terminal to the first transmission terminal, so that the first receiving terminal receives a signal of second data that is sent from the headset to the first connector, and before the headset prepares to send the signal of the second data, the headset sends a second interruption signal.

2. The headset charging and data transmission system of claim 1, wherein the charging device further comprises:
    a first receiver electrically connected to the first receiving terminal and the first controller, and the first receiver configured to amplify and send the signal of the second data to the first controller.

3. The headset charging and data transmission system of claim 2, wherein when the charging device does not send the signal of the first data and does not receive the signal of the second data, the first controller controls the first switching device to electrically connect the power supply terminal to the first transmission terminal, so that the charging device charges the headset.

4. The headset charging and data transmission system of claim 3, wherein the charging device further comprises:
    a voltage converter circuit electrically connected to the power supply terminal; and
    a battery electrically connected to the voltage converter circuit.

5. The headset charging and data transmission system of claim 4, wherein before the charging device prepares to send the signal of the first data, an output of the voltage converter circuit is dropped from the first voltage to a third voltage as a first interruption signal to notify the headset of a pause of charging and preparing to receive the signal of the first data, wherein the second voltage is between the first voltage and the third voltage.

6. The headset charging and data transmission system of claim 5, wherein the charging device further comprises:
   a first comparator electrically connected to the first receiving terminal and the first controller, the first comparator configured to compare the second interruption signal with a first predetermined level, so as to notify the first controller of preparing to receive the signal of the second data.

7. The headset charging and data transmission system of claim 6, wherein the headset comprises:
   a second controller;
   a second connector configured to connect the first connector; and
   a third switching device electrically connected to the second controller and the second connector, the third switching device having a second sending terminal, a second receiving terminal and a second transmission terminal, the second transmission terminal electrically connected to the second connector, and when the charging device charges the headset, the second controller configured to control the third switching device to electrically connect the second receiving terminal to the second transmission terminal.

8. The headset charging and data transmission system of claim 7, wherein the headset further comprises:
   a second comparator electrically connected to the second receiving terminal and the second controller, the second comparator configured to compare the first interruption signal with a second predetermined level, so as to notify the second controller of the pause of the charging and preparing to receive the signal of the first data.

9. The headset charging and data transmission system of claim 8, wherein the headset further comprises:
   a second receiver electrically connected to the second receiving terminal and the second controller, and the second receiver configured to amplify and send the signal of the first data to the second controller.

10. The headset charging and data transmission system of claim 9, wherein the headset further comprising:
    a fourth switching device electrically connected to the second controller and the third switching device, the fourth switching device having a third voltage input terminal, a fourth voltage input terminal, a fifth voltage input terminal and a second output terminal, the second output terminal electrically connected to the second sending terminal, the third voltage input terminal configured to receive the third voltage, the fourth voltage input terminal configured to receive the second voltage, the fifth voltage input terminal configured to receive the first voltage, before preparing to send the signal of the second data, the second controller configured to control the fourth switching device to electrically connect the third voltage input terminal to the second output terminal, so that the second output terminal provides the third voltage as the second interruption signal for the second sending terminal, the second controller configured to control the third switching device to electrically connect the second sending terminal to the second transmission terminal, so that the second connector outputs the second interruption signal to the charging device, and after the second interruption signal is sent, the second controller based on the second data to control the fourth switching device to electrically connect the second output terminal to the fourth voltage input terminal or the fifth voltage input terminal alternately, so that the second output terminal provides the signal of the second data and outputs the signal of the second data to the charging device through the second connector.

* * * * *